(12) United States Patent
Ehrlich et al.

(10) Patent No.: US 9,649,975 B2
(45) Date of Patent: May 16, 2017

(54) VISUAL INDICATOR ADAPTOR AND ASSEMBLY FOR A TRACTOR TRAILER

(75) Inventors: Rodney Ehrlich, Monticello, IN (US); David Pickup, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 987 days.

(21) Appl. No.: 12/793,132

(22) Filed: Jun. 3, 2010

(65) Prior Publication Data

US 2010/0308984 A1    Dec. 9, 2010

Related U.S. Application Data

(60) Provisional application No. 61/184,604, filed on Jun. 5, 2009.

(51) Int. Cl.
G08B 21/00 (2006.01)
B60Q 1/30 (2006.01)
B60Q 1/00 (2006.01)

(52) U.S. Cl.
CPC ........... *B60Q 1/305* (2013.01); *B60Q 1/0088* (2013.01)

(58) Field of Classification Search
None
See application file for complete search history.

(56) References Cited

U.S. PATENT DOCUMENTS

| | | | |
|---|---|---|---|
| 4,241,371 A † | 12/1980 | Sage | |
| 4,631,822 A | 12/1986 | Reinertz | |
| D293,433 S | 12/1987 | Brooks et al. | |
| 4,857,890 A * | 8/1989 | Solow | 340/479 |
| 4,915,654 A | 4/1990 | Zinn | |
| 4,941,838 A | 7/1990 | Zinn | |
| 4,975,088 A | 12/1990 | Brandstater et al. | |
| 4,979,908 A | 12/1990 | Brooks et al. | |
| 4,986,770 A | 1/1991 | Zinn et al. | |
| 5,018,270 A | 5/1991 | Caumanns | |
| 5,021,617 A | 6/1991 | DeShong | |
| 5,064,973 A | 11/1991 | Zinn et al. | |
| 5,101,326 A | 3/1992 | Roney | |
| 5,528,218 A | 6/1996 | Rigsby | |
| 5,632,551 A | 5/1997 | Roney et al. | |
| 5,688,036 A * | 11/1997 | Marshall et al. | 362/485 |
| 5,762,414 A | 6/1998 | Montalan et al. | |
| 5,890,794 A | 4/1999 | Abtahi et al. | |

(Continued)

FOREIGN PATENT DOCUMENTS

DE    202005012221 U1 *  5/2006

OTHER PUBLICATIONS

Grote, 3" Center Dual Function LED Lamps, Oct. 2007, pp. 1-5.*

(Continued)

*Primary Examiner* — Nabil Syed
*Assistant Examiner* — Kevin Lau
(74) *Attorney, Agent, or Firm* — Quarles & Brady LLP

(57) ABSTRACT

A visual indicator assembly and adaptor for a trailer includes a control circuit electrically coupled to a plurality of lamps positioned in a rear header of the trailer. The control circuit is configured to supply a first voltage signal to the plurality of lamps in response to a power signal and supply a second voltage signal to the plurality of lamps in response to a brake signal. The second voltage signal is greater than the first voltage signal.

8 Claims, 5 Drawing Sheets

(56) References Cited

U.S. PATENT DOCUMENTS

| | | | |
|---|---|---|---|
| 6,241,373 B1 | 6/2001 | Kelley et al. | |
| 6,293,687 B1 | 9/2001 | Poirot et al. | |
| 6,371,636 B1 | 4/2002 | Wesson | |
| 6,715,909 B2 | 4/2004 | Serizawa | |
| 6,786,625 B2 | 9/2004 | Wesson | |
| 6,855,006 B2 | 2/2005 | Brooks et al. | |
| D512,790 S | 12/2005 | Handsaker et al. | |
| 7,245,203 B2 | 7/2007 | Stephens et al. | |
| 7,435,093 B1 | 10/2008 | Harmon et al. | |
| 7,518,071 B2 | 4/2009 | DeWitt, III et al. | |
| 7,791,464 B1* | 9/2010 | Giddings et al. | 340/472 |
| 7,893,622 B2† | 2/2011 | Chang | |
| 2002/0191416 A1* | 12/2002 | Wesson | 362/555 |
| 2007/0247298 A1* | 10/2007 | Laukkanen | 340/479 |
| 2008/0037262 A1* | 2/2008 | Wesson | 362/362 |
| 2008/0219015 A1* | 9/2008 | Kolstee et al. | 362/487 |

OTHER PUBLICATIONS

Kuryakyn, Triple Whammy Run-Turn-Brake Light Kit, 2005.*
Lawrence, Mark, "Motorcycle Lights," Feb. 25, 2004, http://motorcycleinfo.calsci.com/Lights.html, Internet Archive, http://web.archive.org/web/20040225084649/http://motorcycleinfor.calsci.com/lights.html, 9 pages.
Radiantz, Inc., Dual Element Circuit for Flex 5-10 LEDs, Dec. 15, 2005, http://www.radiantz.com/626.html, Internet Archive, http://web.archive.org/web/20051211211811/http://www.radiantz.com/index.html?626.html&1, 1 page.
Thorstensen, Eric, "Auxilliary High Mount Stop and Turn Lights," May 1, 2008, Alamo City, Nevada, 4 pages.
Dual Intensity MicroNova, 1 page.
Adapter, 1 page.
Auxiliary High Mount Stop and Turn Lights, The Grote Performance Advantage, 4 pages.
Mark Lawrence, Motorcycle Lights, Feb. 25, 2004, http://motorcycleinfo.calsci.com/Lights.html, Internet Archive, http://web.archive.org/web/20040225084649/http://motorcycleinfo.calsci.com/Lights.html.†
Radiantz, Inc., Dual Element Circuit for Flex 5-10 LEDs, 1, Dec. 15, 2005, http://www.radiantz.com/626.html, Internet Archive, http://web.archive.org/web/20051211211811/http://www.radiantz.com/index.html?626.html&1.†
Eric Thorstensen, Auxilliary High Mount Stop and Turn Lights, 4, May 1, 2008, Alamo City, Nevada.†

\* cited by examiner
† cited by third party

VISUAL INDICATOR ADAPTOR AND ASSEMBLY FOR A TRACTOR TRAILER

CROSS-REFERENCE TO RELATED U.S. PATENT APPLICATION

This application claims priority under 35 U.S.C. §119(e) to U.S. Provisional patent application Ser. No. 61/184,604 entitled "VISUAL SIGNALING INDICATOR AND ASSEMBLY FOR A TRACTOR TRAILER," by Rodney Ehrlich et al., which was filed on Jun. 5, 2009.

TECHNICAL FIELD

The present disclosure relates generally to visual indicator adaptors, devices, circuits, and assemblies for indicating various operating conditions of a tractor trailer such as braking and/or turning.

BACKGROUND

Tractor trailers are commonly used to haul cargo on various roadways. For safety during use, trailers include lamps located on the rear of the trailer and at other locations to provide visual indications to other drivers on the roadways of the presence of the trailer, the size of the trailer, the current operation of the trailer, and/or the desired action by the driver of the tractor trailer. For example, trailers include brake lights that are illuminated at a high intensity to indicate that the trailer is slowing down. Some trailers include additional identification or "running" lights, which are typically located at an elevated position on the trailer and illuminated during operation of the trailer and/or upon activation of the headlights of the trailer.

SUMMARY

According to one aspect, an adaptor configured to be coupled in-line with a rear identification lamp wiring harness of a trailer may include a housing and a circuit positioned in the housing. The circuit may include a first current blocking device electrically coupled between a brake signal input and an output, a second current blocking device electrically coupled to a power input, and a voltage reduction device electrically coupled between the second voltage blocking device and the output. In some embodiments, the first and second current blocking devices may be embodied as diodes. Additionally, the voltage reduction device may be embodied as a resistor. In some embodiments, the resistor may be sized to step-down the voltage of the power input by about 0.5.

Additionally, in some embodiments, the first current blocking device may be embodied as a diode having an anode coupled to the brake signal input and a cathode coupled to the output. Similarly, the current voltage blocking device may be embodied as a diode having an anode coupled to the power input and a cathode coupled to the voltage reduction device. Additionally, in some embodiments, the adaptor may include an output wiring harness extending out of the housing and terminating in a first plug and/or an input wiring harness extending out of the housing and terminating in a plurality of second plugs. Further, in some embodiments, the circuit may be over-molded with the housing.

According to another aspect, a trailer lamp assembly may include a plurality of lamps and a control circuit electrically coupled to the plurality of lamps. The control circuit being may be configured to supply a first voltage signal to the plurality of lamps in response to a power signal and supply a second voltage signal to the plurality of lamps in response to a brake signal. The second voltage signal may be greater than the first voltage signal. For example, in some embodiments, the first voltage signal may be about 6 volts and the second voltage signal may be about 12 volts. In some embodiments, the brake signal is indicative of the application of at least one brake. Additionally, in some embodiments, the plurality of lamps may include a plurality of identification lamps positioned in a rear header of a trailer.

In some embodiments, the trailer lamp assembly may also include a left clearance lamp positioned in the rear header of the trailer and electrically coupled to the control circuit. In such embodiments, the control circuit may be configured to supply the first voltage signal to the left clearance lamp in response to the power signal and supply the second voltage signal to the left clearance lamp in response to the brake signal. Additionally, in some embodiments, the control circuit may be configured to supply a third voltage signal to the left clearance lamp in response to a left turn signal.

In some embodiments, the trailer lamp assembly may also include a right clearance lamp positioned in the rear header of the trailer and electrically coupled to the control circuit. In such embodiments, the control circuit may be configured to supply the first voltage signal to the right clearance lamp in response to the power signal and supply the second voltage signal to the right clearance lamp in response to the brake signal. Additionally, in some embodiments, the control circuit may be configured to supply a third voltage signal to the right clearance lamp in response to a right turn signal.

In some embodiments, the trailer lamp assembly may include a left clearance lamp and a right clearance lamp positioned in the rear header of the trailer and electrically coupled to the control circuit. In such embodiments, the control circuit may be configured to supply the first voltage signal to the left and right clearance lamps in response to the power signal and supply the second voltage signal to the left and right clearance lamps in response to the brake signal. Additionally, the control circuit may be configured to supply a third voltage signal to the left clearance lamp in response to a left turn signal. The control circuit may also be configured to supply a fourth voltage signal to the right clearance lamp in response to a right turn signal.

BRIEF DESCRIPTION OF THE DRAWINGS

The detailed description particularly refers to the following figures, in which.

DETAILED DESCRIPTION OF THE DRAWINGS

Figure 1:
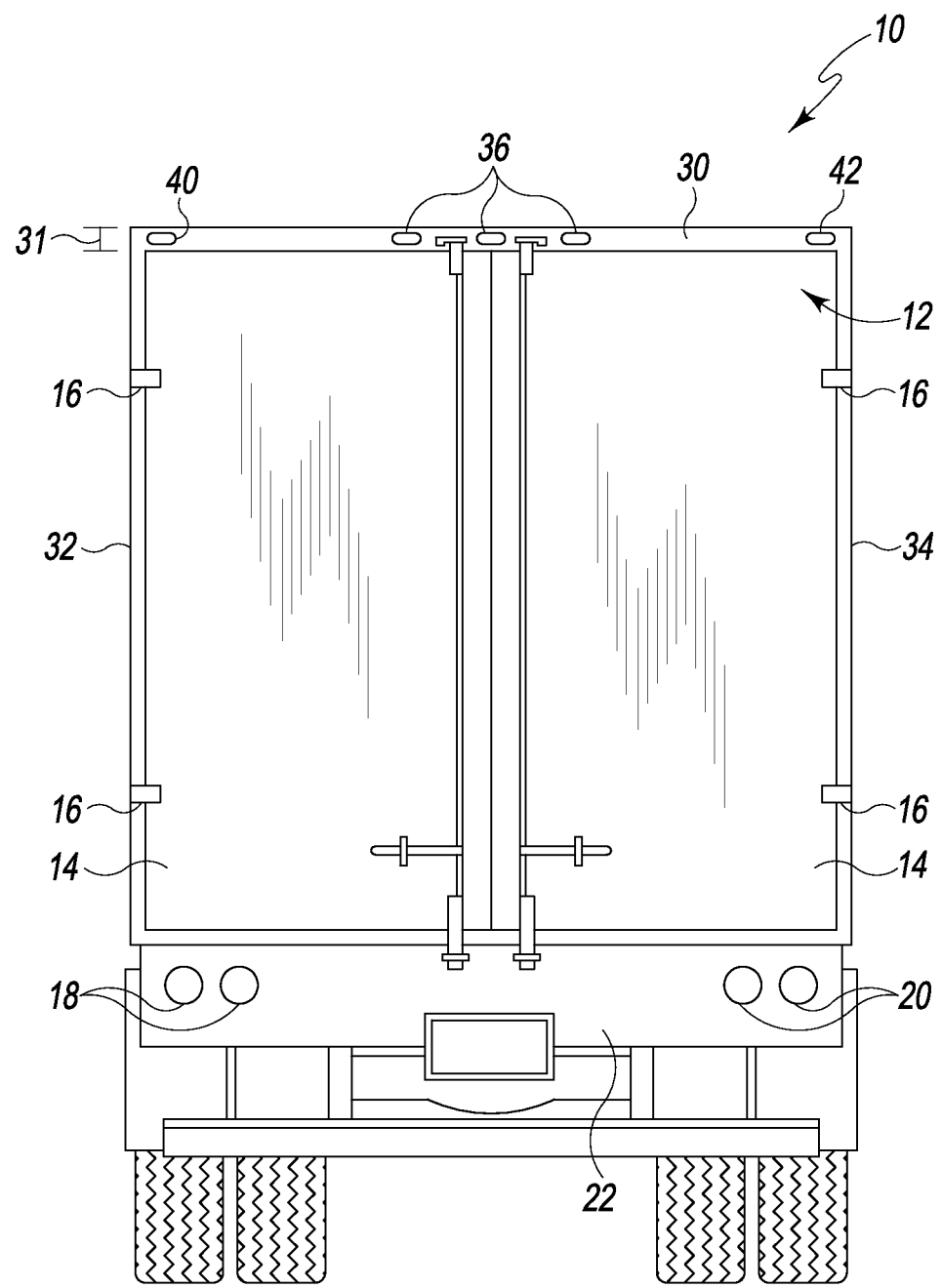
FIG. 1 is a simplified diagram of one embodiment of a tractor trailer.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, in one embodiment, a trailer 10 includes a rear side 12 having a pair of cargo doors 14 coupled thereto via corresponding hinges 16. The cargo doors 14 are configured to swing outwardly to allow access to an internal cavity of the trailer 10 in which cargo may be stored for transportation. The trailer 10 includes a pair of left brake lights 18 and right brake lights 20 positioned in a bumper 22, which is located below the rear side 12. As is typical, the brake lights 18, 20 may function as "running" lights, brake lights, and/or turning signal lights during operation of the vehicle. For example, in some embodiments, the brake lights 18, 20 may be illuminated at a low intensity while the tractor (not shown), to which the trailer 10 is attached, is running or while the headlights of the tractor are turned-on. When the trailer 10 is braking, the brake lights 18, 20 may be illuminated at a high intensity to indicate that the tractor and trailer are slowing down. Additionally, the brake lights 18, 20 may be configured to blink when the operator of the tractor has activated a corresponding turn signal.

The rear side 12 of the trailer 10 also includes a header 30 located above the cargo doors 14. The header 30 extends from a driver side 32 of the trailer 10 to a passenger side 34 of the trailer 10. Illustratively, the header 30 has a height 31 of about 2.5 inches, but may have a greater or lesser height in other embodiments. A plurality of identification (ID) or "running" lamps 36 are centrally located in the header 30. In the illustrative embodiment, the trailer 10 includes three identification lamps 36, but may include more or less in other embodiments. Additionally, the lamps 36 are illustratively embodied as light emitting diode (LED) lamps, but may be embodied as other lights or lamps sized to fit in the header 30 in other embodiments. For example, in one particular embodiment, each of the lamps 36 is embodied as a collection of five TL 35 high output LEDs. During standard operation of the trailer 10, the lamps 36 may be configured to turn on at a low or high intensity when the tractor, to which the trailer 10 is attached, is running and/or when the headlights of the tractor have been turned on.

In some embodiments, the trailer 10 may also include a left clearance lamp 40 and a right clearance lamp 42 located on corresponding lateral ends of the header 30. In the illustrative embodiment, the trailer 10 includes a single left and right clearance lamp 40, 42, but may include more clearance lamps in other embodiments. Additionally, similar to the ID lamps 36, the clearance lamps 40, 42 are illustratively embodied as light emitting diode (LED) lamps, but may be embodied as other lights or lamps in other embodiments. For example, in one particular embodiment, each of the lamps 40, 42 is embodied as a collection of five TL 35 high output LEDs. During standard operation of the trailer 10, the lamps 40, 42 may be configured to turn on at a low or high intensity when the tractor, to which the trailer 10 is attached, is running and/or when the headlights of the tractor have been turned on.

Figure 2:
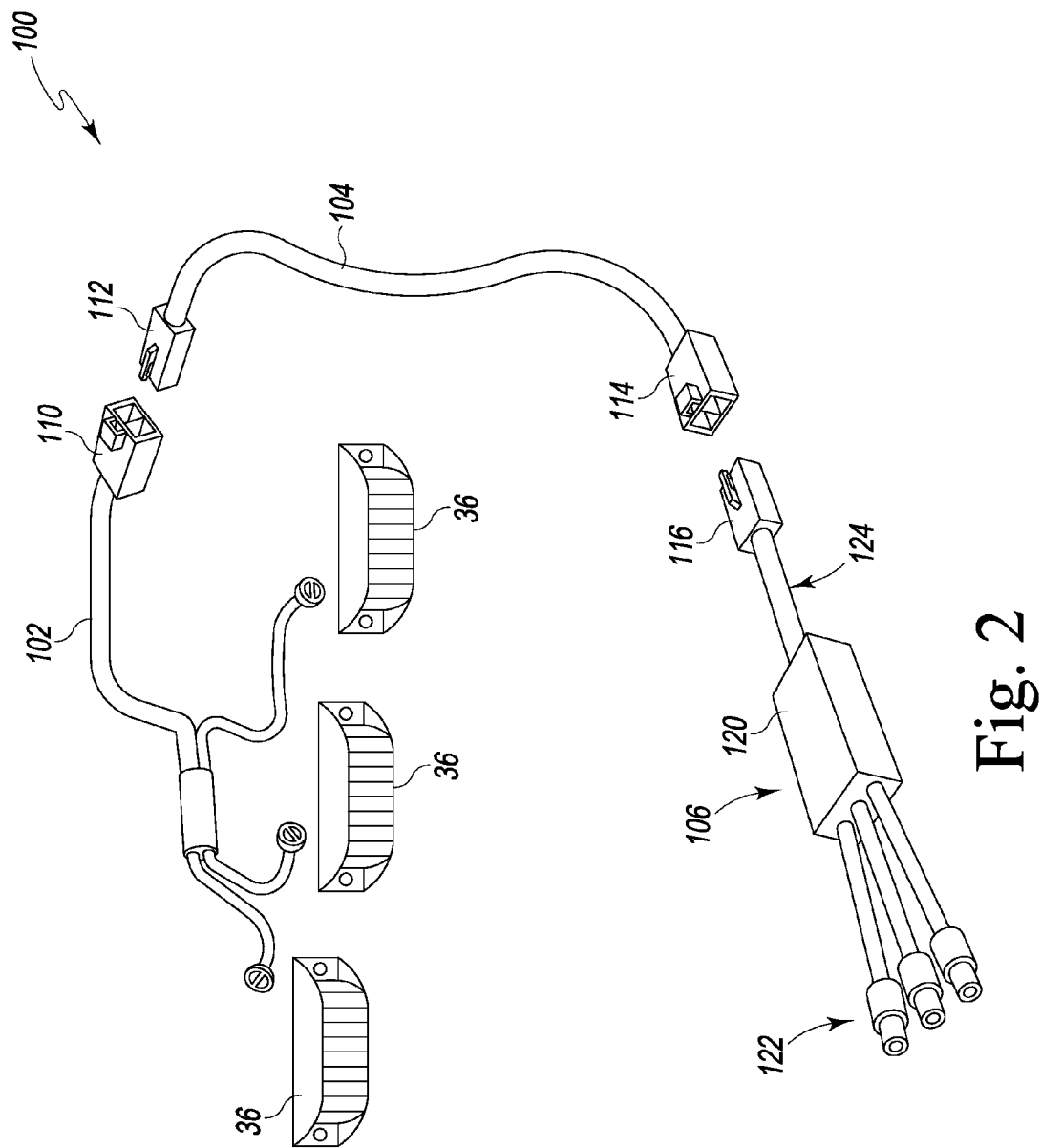
FIG. 2 is a simplified diagram of one embodiment of a visual signaling assembly and adaptor usable with the tractor trailer of FIG. 1.

Referring now to FIG. 2, the trailer 10 includes a visual signaling assembly 100. In one embodiment, the visual signaling assembly 100 includes the plurality of ID lamps 36, a lamp wiring harness 102, a corner post wiring harness 104, and a visual signaling adaptor 106. The lamp wiring harness 102 is configured to couple to the lamps 36 and the corner post wiring harness 104. For example, the lamp wiring harness 102 includes a plug 110 configured to mate with a plug 112 of the corner post wiring harness 104. The corner post wiring harness 104 also includes a plug 114 to which a plug 116 of the adaptor 106 may be coupled. The visual signaling adaptor 106 is illustratively configured as an in-line adaptor. That is, the adaptor 106 may be coupled between the corner post harness 104 and the additional trailer wiring that is typically coupled to the plug 114 of the harness 104 without the need to cut wires, splice wires, or otherwise rewire the lighting, braking, and/or turning circuitry of the trailer 10.

In the illustrative embodiment, the visual signaling adaptor 106 includes a housing 120, a plurality of input wires 122 extending from the housing 120, and a plurality of output wires 124 extending from the housing 120 (and coupled to the plug 116 as shown in FIG. 2). The housing 120 is illustratively sized to fit into a light box of the trailer 10 and may be formed from any suitable rigid material such as a rigid plastic or metal material.

Figure 3:
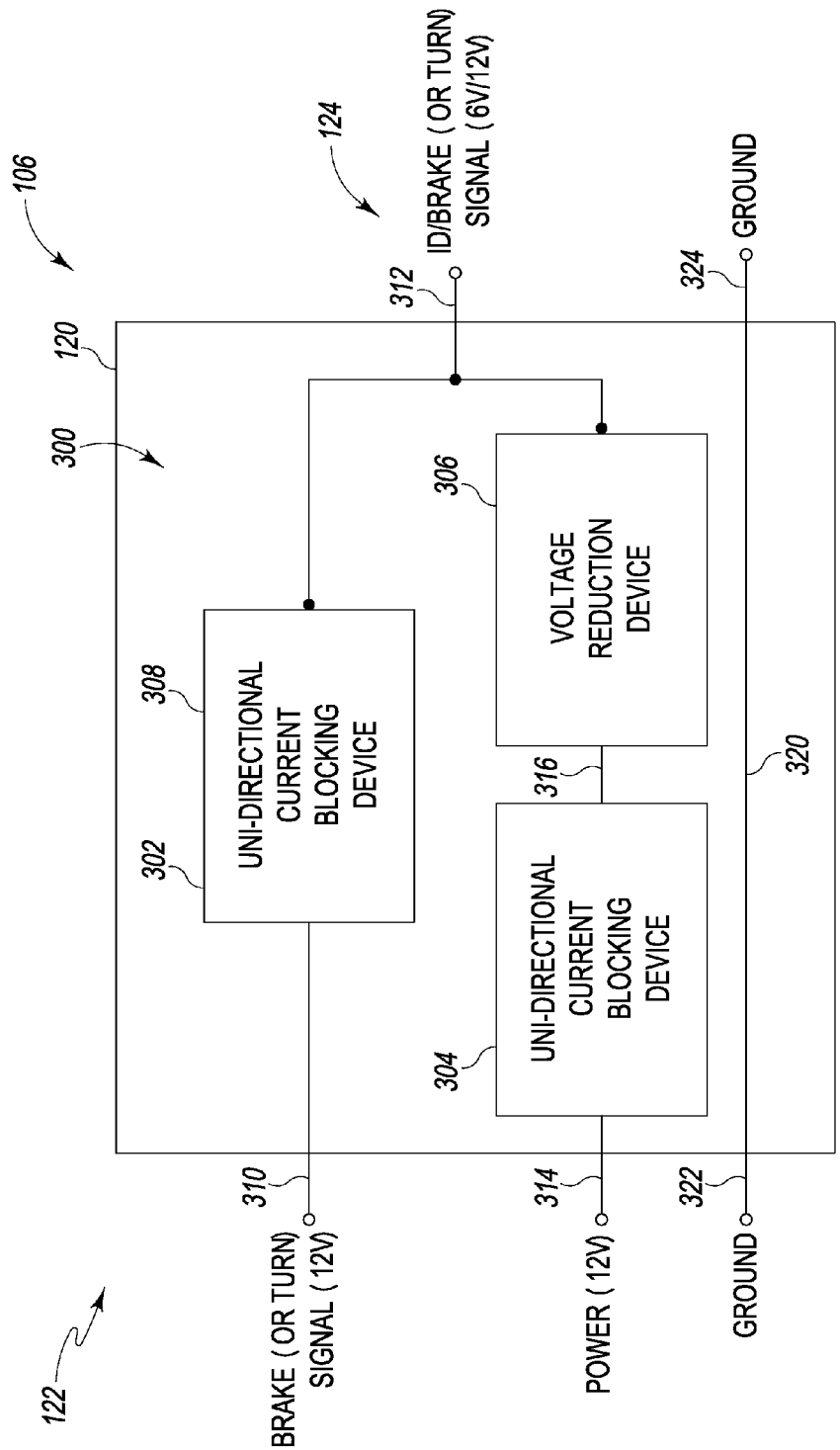
FIG. 3 is a simplified diagram of one embodiment of a signal control circuit of the adaptor of FIG. 2.

As illustrated in FIG. 3, the adaptor 106 includes a signal control circuit 300 positioned in the housing 120. In some embodiments, the circuit 300 may be over-molded with the housing 120 to improve the water resistance of the housing 120. The illustrative control circuit 300 includes a pair of uni-directional current blocking devices 302, 304 and a voltage reduction device 306. The uni-directional current blocking devices 302, 304 may be embodied as any type of device or circuit configured to block current flow in at least one direction at the operative voltage levels. For example, in one embodiment, the uni-directional current blocking devices 302, 304 are embodied as diodes, but may be embodied as a switch, a transistor circuit, or other devices capable of performing the current blocking function in other embodiments. The voltage reduction device 306 may be embodied as any type of device or circuit configured to reduce the voltage level of an input voltage. For example, in one embodiment, the voltage reduction device 306 is embodied as a resistor, but may be embodied as other types of voltage reduction devices or circuits in other embodiments. In one particular embodiment, the voltage reduction device 306 is embodied as a DC-to-DC converter 308.

As shown in FIG. 3, the uni-directional current blocking device 302 is coupled to a brake or turn signal input line 310 and to an ID/Brake signal output line 312. The uni-directional current blocking device 304 is coupled to a power or ID signal input line 314 and to the voltage reduction device 306 via an interconnection wire, trace or path 316. Similarly, the voltage reduction device 306 is coupled to the uni-directional current blocking device 304 via the path 316 and to the ID/Brake signal output line 312. The control circuit 300 also includes a "pass-through" ground signal line 320, which is coupled to an ground input line 322 and a ground output line 324. In some embodiments, the ground signal line 320 may also be coupled to a shielding structure, which may be positioned around the circuit 300.

In use, the signal control circuit 300 is configured to apply a low voltage to the lamps 36 during normal operation (e.g., when the tractor is running or when the headlights are on) and apply a high voltage to the lamps 36 when the brakes of the tractor trailer are applied. As such, the lamps 36 illuminate at a lower intensity during normal running conditions and at a high intensity during braking conditions so as to provide a visual indication that the trailer is slowing down. To do so, a voltage signal is applied to the power/ID signal input line 314. As discussed above, the voltage signal is illustratively a 12 volt signal and may be applied continuously while the tractor, to which the trailer 10 is attached, is running. Alternatively, the voltage signal my be applied only while the headlights of the tractor are turned on or during some other condition. The 12 volt signal is passed by the uni-directional current blocking device 304 and stepped down to about 6 volts by the voltage reduction device 306. Assuming no voltage signal is applied to the brake signal input line 310 (i.e., the trailer is not braking), the 6 volt signal is supplied to the ID/Brake signal output line 312, but blocked from back-feeding onto the brake/turn signal input line 310 via the uni-directional current blocking device 302.

However, when a brake or turn signal (i.e., a 12 volt signal) is applied to the brake/turn signal input line 310, the 12 volt brake/turn signal is passed by the uni-directional current blocking device 302 to the ID/Brake signal output line 312. The 12 volt brake/turn signal is blocked from back-feeding onto the power/ID signal input line 314 via the uni-directional current blocking device 304. In this way, a low voltage signal (e.g., 6 volts) is supplied to the ID/Brake signal output line 312 while the tractor is in the operating condition (e.g., running, headlights are on, etc.) and a high voltage signal (e.g., 12 volts) is supplied to the ID/Brake signal output line 312 when the tractor/trailer 10 is braking. As such, the ID lamps 36 operate as ID lamps and as braking lights when the adaptor 106 is used.

Figure 4:
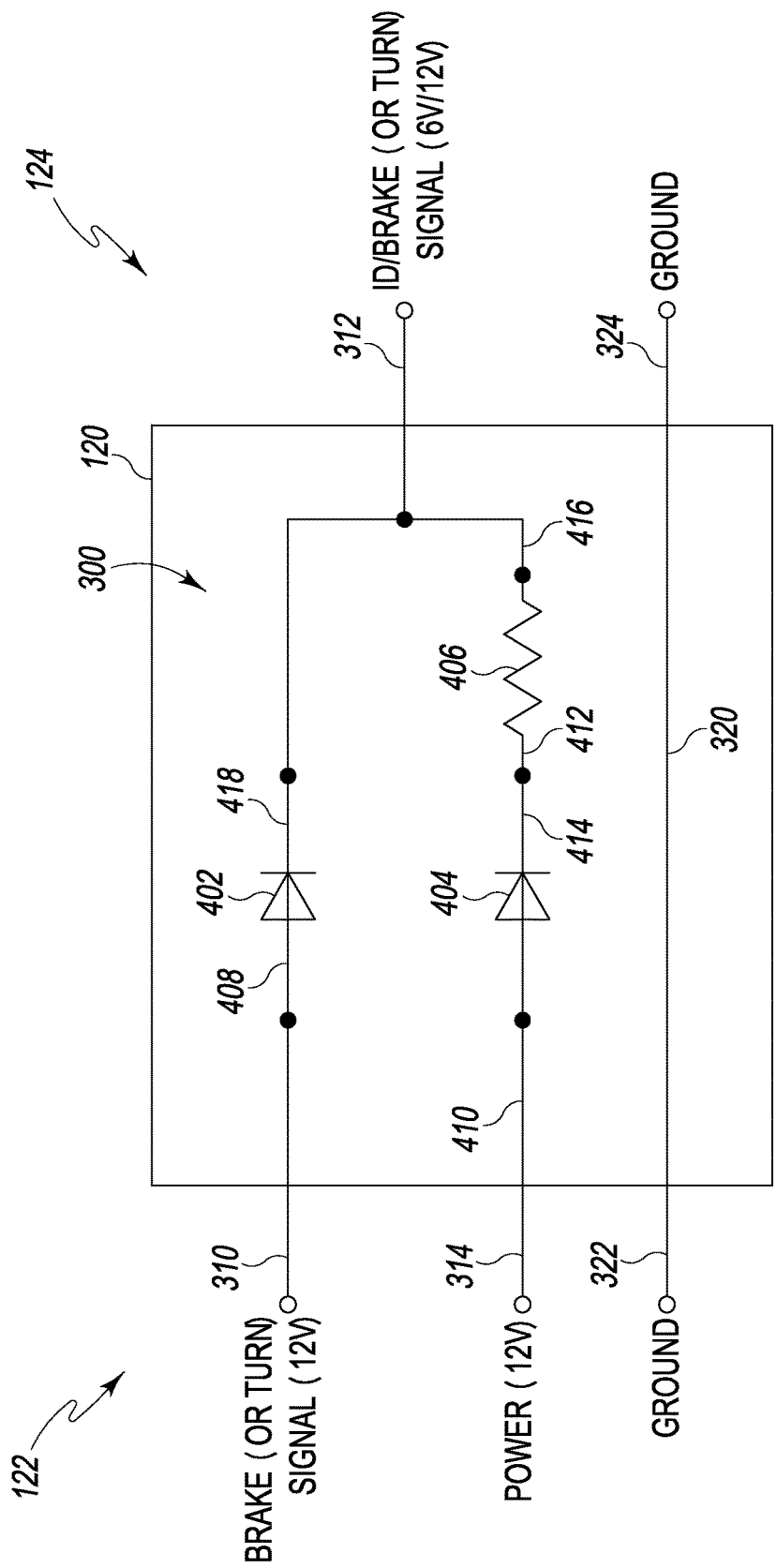
FIG. 4 is a simplified diagram of another embodiment of a signal control circuit of the adaptor of FIG. 2.

Referring now to FIG. 4, one particular embodiment of the control circuit 300 is shown. In the illustrative embodiment, the control circuit 300 includes a pair of diodes 402, 404 and a resistor 406 (or a DC-to-DC converter 308 as discussed below). The diode 402 includes an anode lead 408 coupled to the brake signal input line 310 (or a turn signal wire as discussed below). Similarly, the diode 404 includes an anode lead 410 coupled to the power/ID signal input line 314. A lead 412 of the resistor 406 is coupled to a cathode lead 414 of the diode 404. The opposite lead 416 of the resistor 406 is coupled to the cathode lead 418 of the diode 402 and the ID/Brake signal output line 312. As discussed above, the control circuit 300 also includes a "pass-through" ground signal line 320, which is coupled to an ground input line 322 and a ground output line 324. In some embodiments, the ground signal line 320 may also be coupled to a shielding structure, which may be positioned around the circuit 300.

The diode 402 may be embodied as any type of diode capable of sufficiently blocking the voltage signal applied to the power/ID signal input line 314 from back-feeding to the brake signal input line 310. Similarly, the diode 404 may be embodied as any type of diode capable of sufficiently blocking the voltage signal applied to the brake signal input line 310 from back-feeding to the power/ID signal input line 314. The resistor 406 may be embodied as any type of resistor capable of sufficiently handling the current and voltage applied via the power/ID signal input line 314. Additionally, the resistor 406 is selected such that the voltage applied to the power/ID signal input line 314 is stepped-down a predetermined amount. For example, in one particular embodiment, the resistor 406 is selected such that the voltage applied to the power/ID signal input line 314 is stepped-down to about half the input voltage. For example, if a 12 volt signal is applied to the power/ID signal input line 314, the resistor 406 may be selected such that the voltage at the ID/Brake signal output line 312 is about 6 volts (i.e., when no signal is applied to the brake signal input line 310). In such embodiments, for example, the resistor 406 may have a resistive value approximately equal to the resistance of the load (e.g., the lamps 36).

As discuss above, the signal control circuit 300 is configured to apply a low voltage to the lamps 36 during normal operation (e.g., when the tractor is running or when the headlights are on) and apply a high voltage to the lamps 36 when the brakes of the tractor trailer are applied. As such, the lamps 36 illuminate at a lower intensity during normal running conditions and at a high intensity during braking conditions so as to provide a visual indication that the trailer is slowing down. To do so, a voltage signal is applied to the power/ID signal input line 314. As discussed above, the voltage signal is illustratively a 12 volt signal and may be applied continuously while the tractor, to which the trailer 10 is attached, is running. Alternatively, the voltage signal may be applied only while the headlights of the tractor are turned on or during some other condition. The 12 volt signal is passed by the diode 404 and stepped down to about 6 volts by the resistor 406. Assuming no voltage signal is applied to the brake signal input line 310 (i.e., the trailer is not braking), the 6 volt signal is supplied to the ID/Brake signal output line 312, but blocked from back-feeding onto the brake signal input line 310 via the diode 402.

However, when a braking signal (i.e., a 12 volt signal) is applied to the brake signal input line 310, the 12 volt braking signal is passed by the diode 402 to the ID/Brake signal output line 312. The diode 402 passes the 12 volt braking signal because the cathode lead 418 of the diode 402 is at a lower potential (i.e., 0 or 6 volts) than the anode lead 408 (i.e., 12 volts). The 12 volt braking signal is blocked from back-feeding onto the power/ID signal input line 314 via the diode 404. In this way, a low voltage signal (e.g., 6 volts) is supplied to the ID/Brake signal output line 312 while the tractor is in the operating condition (e.g., running, headlights are on, etc.) and a high voltage signal (e.g., 12 volts) is supplied to the ID/Brake signal output line 312 when the tractor/trailer 10 is braking. As such, the ID lamps 36 operate as ID lamps and as braking lights when the adaptor 106 is used.

Although the adaptor 106 has been described above in regard to a braking signal and the ID lamps 36, it should be appreciated that the adaptor 106 may also be used with the clearance lamps 40, 42 and the associated turn signal in other embodiments. In such embodiments, the turn signal is applied to the turn signal input line 310 and the ID/Turn signal output line 312 is coupled to the associated clearance lamps 40, 42. In such embodiments, the control circuit 300 operates in a substantially similar manner as described above to supply a low voltage signal (e.g., 6 volts) to the ID/Turn signal output line 312 while the tractor is in the operating condition (e.g., running, headlights are on, etc.) and a high voltage signal (e.g., 12 volts) to the ID/Turn signal output line 312 when the respective turn signal is activated by the operator. As such, the clearance lamps 40, 42 operate as clearance lamps and as turn signal lamps when the adaptor 106 is used.

In some embodiments, a separate adaptor 106 may be used for each of the ID lamps 36, the left clearance lamp 40, and the right clearance lamp 42 to provide turning and braking visual indicators in the header 30 of the trailer 10. Alternatively, the adaptor 106 may include a signal control circuit having three sub-circuits 300 (i.e., one circuit 300 for the brake, the left turn, and the right turn signals) in a single housing 120.

Additionally, although the illustrative embodiment of FIG. 4 has been described above in reference to particular electrical components, it should be appreciated that such components may be replaced with other electrical components capable of performing the same function. For example, the diodes 402, 404 may be replaced with other uni-directional current blocking devices such as a transistor circuit or switch. Additionally, the resistor 406 may be replaced with another voltage reduction device in other embodiments. For example, in one particular embodiment, the circuit 300 includes a DC-to-DC converter 308 in place of the resistor 406.

Figure 5:
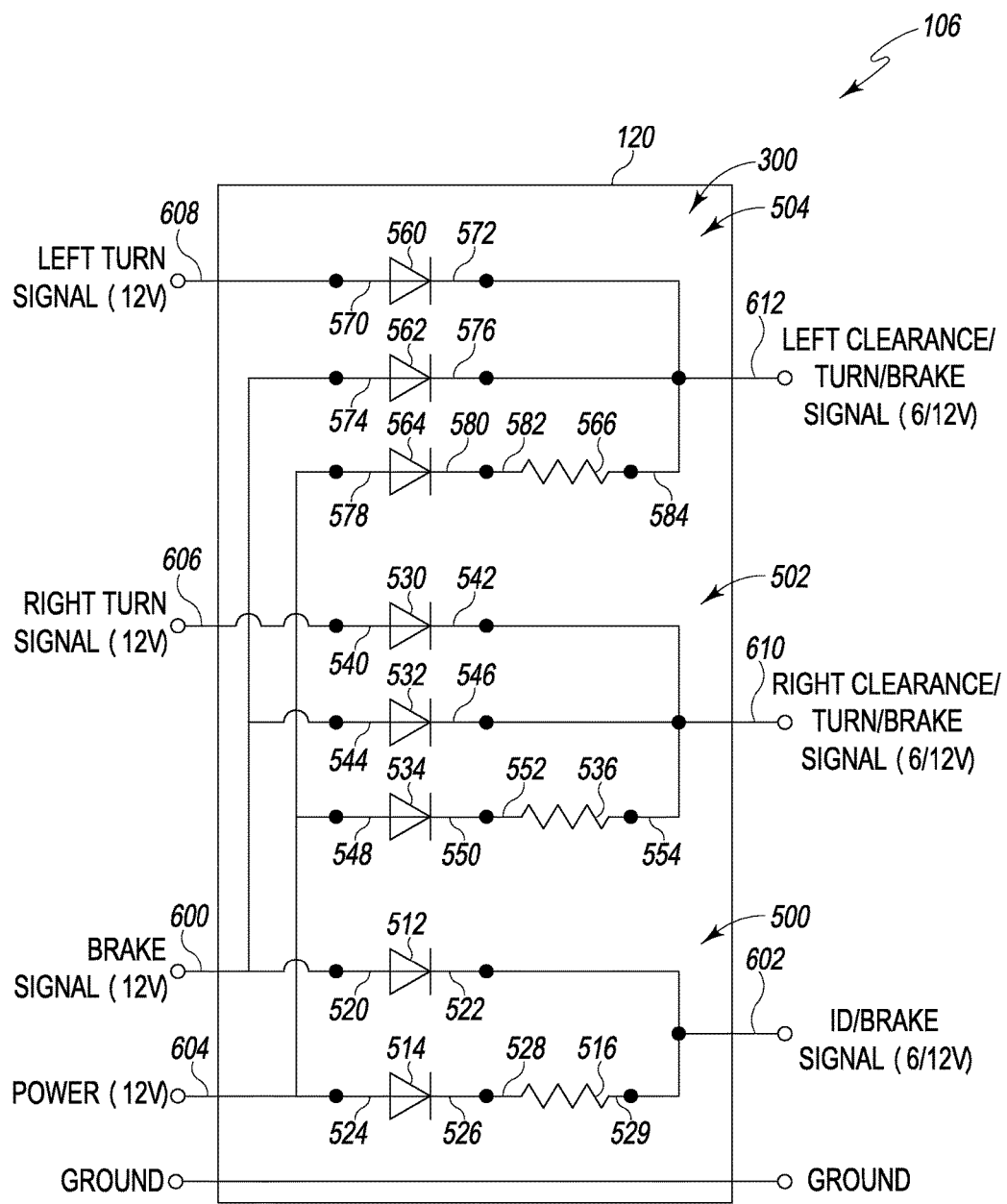
FIG. 5 is a simplified diagram of another embodiment of a signal control circuit of the adaptor of FIG. 2.

Referring now to FIG. 5, in some embodiments, the clearance lamps 40, 42 may be used as clearance, turn, and braking lamps in addition to the ID lamps 36. In such embodiments, the signal control circuit 300 includes a braking signal sub-circuit 500, a right turn signal sub-circuit 502, and a left turn signal sub-circuit 504. The braking signal sub-circuit 500 is substantially similar to and operates in a similar manner as the circuit 300 of FIG. 3 described above. The braking signal sub-circuit 500 includes a pair of diodes 512, 514 and a resistor 516 (or a DC-to-DC converter 308). The diode 512 includes an anode lead 520 coupled to a brake signal input line 600 and a cathode lead 522 coupled to an ID/Brake signal output line 602, which is subsequently coupled to the ID lamps 36. The diode 514 includes an anode lead 524 coupled to a power/ID signal input line 604 and a cathode lead 526 coupled to a lead 528 the resistor 516. An opposite lead 529 of the resistor 516 is coupled to the ID/Brake signal output line 602 and the cathode lead 522 of the diode 512.

The right turn signal sub-circuit 502 includes a plurality of diodes 530, 532, 534 and a resistor 536 (or a DC-to-DC converter 308). The diode 530 includes an anode lead 540 coupled to a right turn signal input line 606 and a cathode 542 coupled to a right clearance/turn/brake signal output line 610. The diode 532 includes an anode lead 544 coupled to the brake signal input line 600 and a cathode lead 546 coupled to the right clearance/turn/brake signal output line 610 and the cathode 542 of the diode 530. The diode 534 includes an anode lead 548 coupled to the power/ID signal input line 604 and a cathode lead 550 coupled to a lead 552 the resistor 536. An opposite lead 554 of the resistor 536 is coupled to the right clearance/turn/brake signal output line 610 and the cathode leads 542, 546 of the respective diodes 530, 532.

The left turn signal sub-circuit 504 is similar to the right turn signal sub-circuit 502. The circuit 504 includes a plurality of diodes 560, 562, 564 and a resistor 566 (or a DC-to-DC converter 308). The diode 560 includes an anode lead 570 coupled to a left turn signal input line 608 and a cathode 572 coupled to a left clearance/turn/brake signal output line 612. The diode 562 includes an anode lead 574 coupled to the brake signal input line 600 and a cathode lead 576 coupled to the left clearance/turn/brake signal output line 612 and the cathode 572 of the diode 560. The diode 564 includes an anode lead 578 coupled to the power/ID signal input line 604 and a cathode lead 580 coupled to a lead 582 the resistor 566. An opposite lead 584 of the resistor 566 is coupled to the left clearance/turn/brake signal output line 612 and the cathode leads 542, 546 of the respective diodes 530, 532.

In use, the signal control circuit 300 of FIG. 5 is configured to apply a low voltage to the lamps 36, 40, 42 during normal operation (e.g., when the tractor is running or when the headlights are on) and apply a high voltage to the lamps 36, 40, 42 when the brakes of the tractor trailer are applied. Additionally, a high voltage signal, which may be embodied as a blinking signal in some embodiments, is applied to the respective lamp 40, 42 when the respective turn signal is activated and the brakes of the tractor trailer are not applied (i.e., the braking signal "overrides" the turn signal). To do so, a voltage signal is applied to the power/ID signal input line 604. As discussed above, the voltage signal is illustratively a 12 volt signal and may be applied continuously while the tractor, to which the trailer 10 is attached, is running. Alternatively, the voltage signal may be applied only while the headlights of the tractor are turned on or during some other condition. The 12 volt signal is passed by the diodes 514, 534, 564 and stepped down to about 6 volts by the respective resistors 516, 536, 566. Assuming no voltage signal is applied to the brake signal input line 600 (i.e., the trailer is not braking), the right turn signal input line 606, and the left turn signal input line 608, the 6 volt signal is supplied to the ID/Brake signal output line 602, the right clearance/turn/brake signal output line 610, and the left clearance/turn/brake signal output line 612. However, the 6 volt signal is blocked from back-feeding onto the brake signal input line 600 via the diode 512, 532, 562, from back-feeding onto the right turn signal input line 606 via the diode 530, and from back-feeding onto the left turn signal input line 608 via the diode 560.

When a braking signal (i.e., a 12 volt signal) is applied to the brake signal input line 600, the 12 volt braking signal is passed by the diode 512 to the ID/Brake signal output line 602, by the diode 532 to the right clearance/turn/brake signal output line 610, and by the diode 562 to the left clearance/turn/brake signal output line 612. The braking signal is blocked from back-feeding onto the power/ID signal input line 604 via the diodes 514, 534, 564, from back-feeding onto the right turn signal input line 606 via the diode 530, and from back-feeding onto the left turn signal input line 608 via the diode 560. If a right turning signal (i.e., a 12 volt signal) is applied to the right turn signal input line 606, the 12 volt turning signal is passed by the diode 530 to the right clearance/turn/brake signal output line 610 and blocked from back-feeding onto the brake signal input line 600 via diode 532 and onto the power/ID signal input line 604 via the diode 534. Similarly, if a left turning signal (i.e., a 12 volt signal) is applied to the left turn signal input line 608, the 12 volt turning signal is passed by the diode 560 to the left clearance/turn/brake signal output line 612 and blocked from back-feeding onto the brake signal input line 600 via diode 562 and onto the power/ID signal input line 604 via the diode 564. As such, the ID lamps 36 operate as ID lamps and as braking lights and the lamps 40, 42 operate as clearance lamps, braking lamps, and turning lamps when the adaptor 106 is used.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the devices, systems, and methods described herein. It will be noted that alternative embodiments of the devices, systems, and methods of the present disclosure may not include all of the features described yet still benefit from at least some of the advantages of such features. Those of ordinary skill in the art may readily devise their own implementations of the devices, systems, and methods that incorporate one or more of the features of the present invention and fall within the spirit and scope of the present disclosure as defined by the appended claims.

The invention claimed is:

1. A trailer lamp assembly of a trailer, the trailer lamp assembly comprising:

a plurality of identification lamps located in a header of the trailer opposite a bumper of the trailer in which a right brake lamp and a left brake lamp are located, the plurality of identification lamps including a plurality of identification lamp bulbs, the right brake lamp including a right clearance lamp bulb, and the left brake lamp including a left brake lamp bulb;

a right clearance lamp and a left clearance lamp located in the header of the trailer, the plurality of identification lamps positioned between the right and left clearance lamps; and an adaptor comprising a housing, a plurality of input lines extending from the housing, a plurality of output lines extending from the housing, and a control circuit positioned in the housing, wherein the adaptor is positioned outside of the plurality of identification lamp bulbs, outside of the right clearance lamp bulb, and outside of the left clearance lamp bulb;

wherein the plurality of input lines comprises (i) a power input line extending from the housing and electrically coupled to the control circuit, wherein the power input line is configured to receive a power signal, (ii) a brake input line extending from the housing and electrically coupled to the control circuit, wherein the brake input line is configured to receive a brake signal, (iii) a right turn input line extending from the housing and electrically coupled to the control circuit, wherein the right turn input line is configured to receive a right turn signal, (iv) a left turn input line extending from the housing and electrically coupled to the control circuit, wherein the left turn input line is configured to receive a left turn signal, and (v) a first end of a ground pass-through line;

wherein the plurality of output lines comprises (i) an identification lamps output line extending from the housing and electrically coupled to the control circuit and to the plurality of identification lamps, (ii) a left clearance lamp output line extending from the housing and electrically coupled to the control circuit and to the left clearance lamp, (iii) a right clearance lamp output line extending from the housing and electrically coupled to the control circuit and to the right clearance lamp; and (iv) a second end of the ground pass-through line, wherein the ground pass-through line extends through the housing with no electrical connection to the signal control circuit; and wherein the control circuit comprises:

a brake signal sub-circuit comprising a first current blocking device electrically coupled to the brake input line and the identification lamps output line, a second current blocking device electrically coupled to the power input line and the identification lamps output line, and a first voltage reduction device in series with the second current blocking device, wherein the brake signal sub-circuit is configured to supply (i) a first voltage signal to the identification lamps output line based on the power signal and (ii) a second voltage signal, greater than the first voltage signal, to the identification lamps output line based on the brake signal;

a right turn signal sub-circuit comprising a third current blocking device electrically coupled to the right turn input line and the right clearance lamp output line, a fourth current blocking device electrically coupled to the brake input line and the right clearance lamp output line, a fifth current blocking device electrically coupled to the power input line and the right clearance lamp output line, and a second voltage reduction device in series with the fifth current blocking device, wherein the right turn signal sub-circuit is configured to supply (i) a third voltage signal to the right clearance lamp output line based on the power signal, (ii) a fourth voltage signal to the right clearance lamp output line based on the brake signal, and (iii) a fifth voltage signal to the right clearance lamp output line based on the right turn signal, wherein the third voltage signal is less than each of the fourth voltage signal and the fifth voltage signal; and a left turn signal sub-circuit comprising a sixth current blocking device electrically coupled to the left turn input line and the left clearance lamp output line, a seventh current blocking device electrically coupled to the brake input line and the left clearance lamp output line, an eighth current blocking device electrically coupled to the power input line and the left clearance lamp output line, and a third voltage reduction device in series with the eighth current blocking device, wherein the left turn signal sub-circuit is configured to supply (i) a sixth voltage signal to the left clearance lamp output line based on the power signal, (ii) a seventh voltage signal to the left clearance lamp output line based on the brake signal, and (iii) an eighth voltage signal to the left clearance lamp output line based on the left turn signal, wherein the sixth voltage signal is less than each of the seventh voltage signal and the eighth voltage signal.

2. The trailer lamp assembly of claim 1, wherein the first, third, and sixth voltage signals are about 6 volts and the second, fourth, fifth, seventh, and eighth voltage signals are about 12 volts.

3. The trailer lamp assembly of claim 1, wherein the brake signal is indicative of the application of at least one brake.

4. The trailer lamp assembly of claim 1, wherein the first current blocking device is a diode, the first voltage reduction device is a resistor, and the second current blocking device is a diode.

5. The trailer lamp assembly of claim 1, wherein the third current blocking device is a diode, the second voltage reduction device is a resistor, the fourth current blocking device is a diode, and the fifth current block device is a diode.

6. The trailer lamp assembly of claim 1, wherein the sixth current blocking device is a diode, the third voltage reduction device is a resistor, the seventh current blocking device is a diode, and the eighth current block device is a diode.

7. The trailer lamp assembly of claim 1, further comprising: at least one input wiring harness extending out of the housing and terminating in a first plug, wherein the at least one input wiring harness comprises at least one of the power input line, the brake input line, the right turn input line, the left turn input line, or the ground passthrough wire; and at least one output wiring harness extending out of the housing and terminating in a second plug, wherein the at least one output wiring harness comprises at least one of the identification lamps output line, the left clearance lamp output line, the right clearance lamp output line, and the ground pass-through wire.

8. The trailer lamp assembly of claim 7, wherein the at least one output wiring harness comprises an identification lamps output wiring harness comprising the identification lamps output line, a left clearance lamp output wiring harness comprising the left clearance lamp output line, and a right clearance lamp output wiring harness comprising the right clearance lamp output line.

* * * * *